United States Patent
Cheikh (10) Patent No.: US 10,270,296 B2
(45) Date of Patent: Apr. 23, 2019

(54) DEVICE FOR DETECTING A PARASITIC METALLIC OBJECT IN THE EMISSION ZONE OF A DEVICE FOR RECHARGING A USER APPARATUS FOR AN AUTOMOTIVE VEHICLE AND ASSOCIATED DETECTION METHOD

(71) Applicants: Continental Automotive France, Toulouse (FR); Continental Automotive GmbH, Hannover (DE)

(72) Inventor: Mohamed Cheikh, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 15/773,003

(22) PCT Filed: Nov. 3, 2016

(86) PCT No.: PCT/EP2016/001826
§ 371 (c)(1),
(2) Date: May 2, 2018

(87) PCT Pub. No.: WO2017/076502
PCT Pub. Date: May 11, 2017

(65) Prior Publication Data
US 2018/0323658 A1    Nov. 8, 2018

(30) Foreign Application Priority Data
Nov. 6, 2015 (FR) ...................................... 15 60669

(51) Int. Cl.
*H02J 50/60* (2016.01)
*H02J 50/10* (2016.01)
(Continued)

(52) U.S. Cl.
CPC ............. *H02J 50/60* (2016.02); *B60L 11/182* (2013.01); *G01V 3/104* (2013.01); *H01F 38/14* (2013.01);
(Continued)

(58) Field of Classification Search
CPC ....................................................... H02J 50/60
See application file for complete search history.

(56) References Cited

U.S. PATENT DOCUMENTS 9,178,361 B2 * 11/2015 Liu ..................... H02J 5/005
9,530,558 B2 * 12/2016 Nakano .............. H02J 50/60
(Continued)

FOREIGN PATENT DOCUMENTS

DE       102013219131 A1    3/2015

OTHER PUBLICATIONS

English Translation of the Written Opinion for International Application No. PCT/EP2016/001826, dated Feb. 14, 2017, 5 pages.
(Continued)

*Primary Examiner* — Fritz M Fleming
(74) *Attorney, Agent, or Firm* — RatnerPrestia (57) ABSTRACT

A device for detecting the presence of a parasitic metal object on a reception surface of a device for recharging a user apparatus for an automotive vehicle, the device including an antenna of the emitting coil type and: at least two identical passive detection coils, situated between the emitting coil and the reception surface; a determiner for determining the quality factor across the terminals of the two coils, and of the emitting coil; a controller; a storage device for storing the quality factors at predetermined instances; a calculator for calculating ratios between the stored quality factors, or between values of the quality factors stored at different predetermined instances; a comparator for comparing between the ratios in order to detect the presence of an interfering metal object on the reception surface.

11 Claims, 4 Drawing Sheets

(51) Int. Cl.
*H02J 50/20* (2016.01)
*B60L 11/18* (2006.01)
*G01V 3/10* (2006.01)
*H01F 38/14* (2006.01)
*H02J 7/02* (2016.01)

(52) U.S. Cl.
CPC ............. *H02J 7/025* (2013.01); *H02J 50/10* (2016.02); *H02J 50/20* (2016.02)

(56) References Cited

U.S. PATENT DOCUMENTS

| | | | |
|---|---|---|---|
| 9,981,564 B2 * | 5/2018 | Nakamura | ............. G01V 3/104 |
| 2013/0093257 A1 | 4/2013 | Goto | |
| 2014/0001881 A1 * | 1/2014 | Murakami | ............. H02J 5/005 |
| | | | 307/104 |
| 2015/0028875 A1 | 1/2015 | Irie et al. | |
| 2016/0336760 A1 * | 11/2016 | Yamamoto | ............. H02J 50/10 |
| 2017/0310166 A1 * | 10/2017 | Huang | ...................... H01F 1/00 |
| 2018/0076671 A1 * | 3/2018 | Chopra | ............... B60L 11/1838 |

OTHER PUBLICATIONS

International Search Report and Written Opinion for International Application No. PCT/EP2016/001826, dated Feb. 14, 2017, 8 pages.

* cited by examiner

DEVICE FOR DETECTING A PARASITIC METALLIC OBJECT IN THE EMISSION ZONE OF A DEVICE FOR RECHARGING A USER APPARATUS FOR AN AUTOMOTIVE VEHICLE AND ASSOCIATED DETECTION METHOD

CROSS REFERENCE TO RELATED APPLICATIONS

This application is the U.S. National Phase Application of PCT/EP2016/001826, filed Nov. 3, 2016, which claims priority to French Patent Application No. 1560669, filed Nov. 6, 2015, the contents of such applications being incorporated by reference herein.

FIELD OF THE INVENTION

The invention pertains to the field of the recharging with energy by induction of a user apparatus in an automotive vehicle and relates more specifically to a method and a device for detecting a parasitic metallic object in the emission zone of an induction-based recharging device of a user apparatus in an automotive vehicle.

BACKGROUND OF THE INVENTION

Nowadays, certain automotive vehicles are provided with a device allowing the recharging by induction of a battery of a user apparatus such as, for example, a mobile phone. The term "battery" is understood to mean in the present document an electrical energy storage unit for powering the user apparatus.

Such a recharging device comprises a management module, an emission module and a reception surface for the user apparatus. The emission module comprises at least one antenna of induction emitting coil type which is coupled to the reception surface and which generates an electromagnetic field around the reception surface in a so-called "emission" zone, by operating for example in a frequency band lying between 100 and 200 kHz. The management module of the device is configured to control the emission module, in particular the power level of the emission by the coil, so as to detect a variation of voltage across the terminals of the emitting coil and to exchange messages with the user apparatus.

The user apparatus comprises, in a complementary manner, a control module and a receiver module. The receiver module comprises at least one antenna of induction receiving coil type which detects an electromagnetic field generated by the recharging device when it is placed in the emission zone of said device. The control module of the user apparatus is configured to control the reception module and exchange messages with the recharging device. An exemplary magnetic-induction-based power transfer system is known from the specification defined by the WPC consortium (the acronym standing for "Wireless Power Consortium"), known by the name "Qi low power specification" (version 1.1 of March 2012), incorporated by reference, which defines in particular the exchanges of messages between the recharging device and the user apparatus.

In a known manner, the electromagnetic field generated by the emitting coil induces an AC current in the receiving coil which makes it possible to recharge the battery of the user apparatus.

Thus, when the user wishes to electrically recharge the battery of his apparatus, he places it on the device's reception surface, thereby varying the voltage across the terminals of the emitting coil of the device.

The management module of the device detects this voltage variation and deduces therefrom that an at least partly metallic object has been placed on the reception surface.

The management module of the device then dispatches a recognition message to ascertain whether the object placed on the surface is a user apparatus compatible with the recharging device, that is to say which can be recharged by the device, or else another object such as an incompatible user apparatus or any other at least partly metallic object.

Hence, when the user apparatus is compatible with the device, its control module responds to the device by dispatching a compatibility message and the recharging by induction of the user apparatus starts until it is finished or until the user apparatus exits the emission zone.

When the user apparatus is incompatible with the device, its control module responds to the device by dispatching an incompatibility message and no electromagnetic field emission is carried out by the emission module of the device.

When the object is not an electrically rechargeable user apparatus or is any other at least partly metallic object such as a coin for example, no response message is received by the management module of the device subsequent to its emission of the recognition message and no electromagnetic field emission is initiated by the emission module of the device.

Such a message exchange thus makes it possible to limit access to recharging solely to compatible user apparatuses. Indeed, the generation of an electromagnetic field on a metallic object, for example of coin type, can lead to a significant rise in its temperature, for example greater than 80° C., and this may present risks of burns to the user.

Hereinafter, "parasitic object" will refer to an at least partly metallic object liable to heat up sufficiently to present a danger to the user when subjected to an electromagnetic field generated by the emitting coil of the device.

Such a danger can thus arise when a user apparatus and a parasitic object are present simultaneously in the emission zone during recharging of the user apparatus, thus presenting a significant drawback.

In order to ensure that there is no parasitic object present in the emission zone, the WPC protocol proposes to calculate the difference between the power emitted by the emitting coil and the power received by the receiving coil and to compare this difference with a predetermined threshold, for example 1 W.

This calculation is carried out at the level of the management module of the device which already knows the emission power of the emitting coil. It is therefore necessary for the device to receive the value of power received by the user apparatus. This information can be dispatched in a known manner by the user apparatus, as is for example described in the WPC protocol.

When the difference between the power emitted and the power received is smaller than the predetermined threshold, the management module of the device deduces therefrom that the object placed on the reception support is a user apparatus whilst if the difference between the power emitted and the power received is greater than the predetermined threshold, the management module of the device deduces therefrom that a parasitic object, which absorbs a great deal of energy, is present in the emission zone of the device.

This solution presents drawbacks however. Indeed, to limit the power emitted by the emitting coil, it is necessary for the emitting coil and the receiving coil to be perfectly aligned, i.e. superposed. By way of example, an emission power of 7 W may suffice to obtain a reception power of 5 W when the emitting coil and the receiving coil are perfectly aligned. On the other hand, when the emitting coil and the receiving coil are not aligned, this being frequent with a recharging device for automotive vehicle for which the user is content to place his user apparatus on a reception surface devoid of positioning means, the power received may be appreciably reduced, for example by 80% of the value of the emission power.

In order to solve this problem, the management module of the device uses in a known manner the information in respect of power received dispatched by the user apparatus and controls the emission module so that it increases the emission power of the emitting coil. Thus, still by way of example, it may be necessary to increase the emission power to 15 W to obtain a reception power of 5 W when the emitting coil and the receiving coil are not aligned.

However, in the case where the emitting coil and the receiving coil are not aligned, the difference between the power emitted and the power received is greater than the predetermined threshold mentioned previously so that the management module of the device may incorrectly deduce therefrom that a parasitic object is present in the emission zone of the device, thus presenting a significant drawback.

It is also known to detect a metallic parasitic object, by measuring the variation of the quality factor of the emitting coil and the variation of the voltage across the terminals of said coil. By comparing, the measured values, with predetermined thresholds, it is possible to detect the presence of a metallic parasitic object.

However, the variation of the quality factor of the emitting coil, and the variation of the voltage across the terminals of said coil in the simultaneous presence of a metallic parasitic object and of said apparatus (for example a coin placed under the apparatus) are dependent on the type of user apparatus, on its dimensions, on its composition (metallic, plastic), and on the characteristics of the receiving coil. This detection method is therefore not robust, and does not allow reliable detection since it is not possible to fix a unique predetermined detection threshold in order to detect a metallic parasitic object for all types of user apparatus inclusive.

SUMMARY OF THE INVENTION

The aim of an aspect of the invention is to solve these drawbacks at least partly by proposing a simple, reliable and effective solution for detecting a parasitic object in the emission zone of the recharging device.

An aspect of the invention proposes a device for detecting presence of a parasitic metallic object on a reception surface of a device for recharging by induction of a battery of a user apparatus for automotive vehicle, said recharging device comprising an emission module, a management module, and a reception surface for a user apparatus, said emission module comprising at least one antenna of induction emitting coil type coupled to the reception surface and configured to generate an electromagnetic field around the reception surface in a so-called "emission" zone, said management module of the device being configured to detect the presence of the user apparatus on the reception surface and to control the emission module, said detection device being noteworthy in that it comprises:

At least two identical passive detection coils, situated between the emitting coil and the reception surface:

Each coil, a first coil and a second coil forming a continuous loop, open at its ends and comprising a plurality of mutually spaced identical segments connected together by a link, Said two coils being superposed, in two parallel planes, and are mutually offset by a segment, in such a way that the respective segments of each coil cover distinct surface areas of the reception surface, The segments being disposed in a symmetric manner with respect to one of two perpendicular axes crossing at a center of the reception surface, First means for determining a first quality factor across the terminals of the first coil, Second means for determining a second quality factor across the terminals of the second coil, Third means for determining a third quality factor across the terminals of the emitting coil, Means of control of the first, second, and third determining means, Means for storing the first, second and third quality factor at predetermined instants, Means for calculating ratios between the first, second and third stored quality factors, or between values of quality factors stored at different predetermined instants, Means of comparison between the ratios so as to detect the presence of a parasitic metallic object on the reception surface.

In a first embodiment, the calculation means calculate:

A first ratio which is equal ratio between a third initial quality factor and a third final quality factor, A second ratio which is equal to the ratio between an average of the first initial and of the second initial quality factor and an average of the first final and of the second final quality factor, and the comparison means compare the first ratio with the second ratio.

In a second embodiment, the calculation means calculate:

A first ratio which is equal to the ratio between a third initial quality factor and an average of the first initial and of the second initial quality factor, A second ratio which is equal to the ratio between a third final quality factor, and an average of the first final and of the second final quality factor, and the comparison means compare the first ratio with the second ratio.

Preferentially, the parallel planes (P1, P2) are merged.

Advantageously, the segments are of smaller dimensions than the dimensions of the emitting coil.

Judiciously, a number of segments is k times proportional to a number of emitting coils, with k>4.

In a preferential manner, a sum of the distinct surface areas covered by the segments of said two coils is substantially equal to the reception surface area.

And the passive detection coils consist of a single winding of copper wire.

The first determining means, the second determining means, the third determining means, the storage means, the control means, the calculation means and the comparison means can take the form of software, integrated into the management module.

An aspect of the invention also relates to a method of detecting presence of a parasitic metallic object, using the detection device according to any one of the characteristics enumerated hereinabove, the method comprising the following steps:

Step E1: Prior determination of the first initial quality factor, of the second initial quality factor, of the third initial quality factor in the absence of user apparatus on the reception surface, Step E2: storage of the values of the first initial quality factor, of the second initial quality factor, of the third initial quality factor, Step E3: detection of the presence of a user apparatus on the reception surface, Step E4: Determination of the first final quality factor, of the second final quality factor, of the third final quality factor, Step E5: calculation of a first average between the first initial quality factor and the second initial quality factor, and of a second average between the first final quality factor and the second final quality factor, Step E6: Calculation of a first ratio between the third initial quality factor and the third final quality factor, or between the third initial quality factor and the first average and calculation of a second ratio between the first average and the second average, or between the third final quality factor and the second average, Step 7: If the first ratio is greater, to within a predetermined factor, than the second ratio, then:
presence of a parasitic metallic object on the reception surface,
Else
absence of said parasitic metallic object.

An aspect of invention applies also to any automotive vehicle, comprising a detection device according to any one of the characteristics enumerated hereinabove.

BRIEF DESCRIPTION OF THE DRAWINGS

Other features and advantages of the present invention will become more apparent from reading the following description, provided by way of non-limiting example and with reference to the appended drawings, in which.

DETAILED DESCRIPTION OF THE PREFERRED EMBODIMENTS

An aspect of the invention relates to a device D for detecting presence of a parasitic metallic object 30 on a reception surface S of a device 10 for recharging by induction of a battery 21 of a user apparatus 20.

Figure 1:
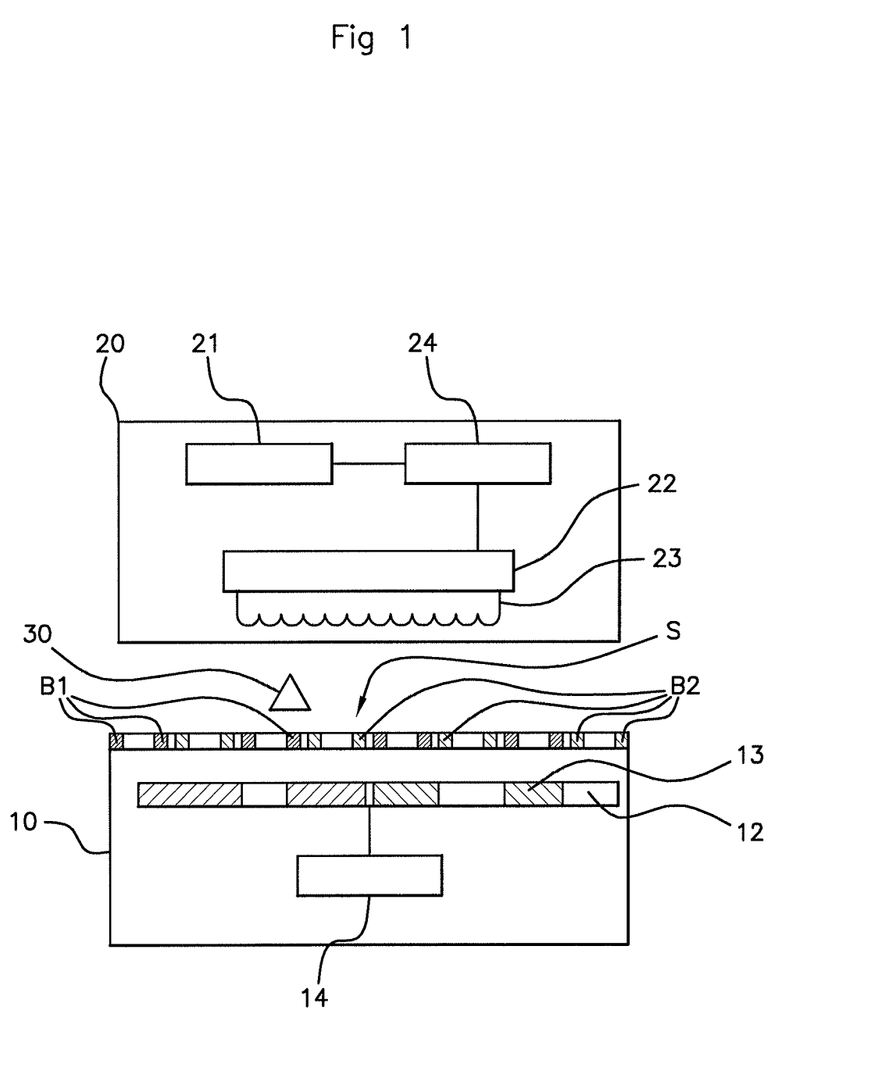
FIG. 1 schematically illustrates a sectional view of the recharging device comprising the detection coils of the device for detecting presence of a parasitic metallic object according to an aspect of the invention, FIG. 2 schematically illustrates a view from above of the detection coils of the presence device of a parasitic metallic object according to an aspect of the invention, FIG. 3 schematically represents the presence detection device according to an aspect of the invention, included in the recharging device, FIG. 4 schematically represents the detection method of an aspect of the invention.

As illustrated in FIG. 1, a recharging device 10 generally comprises an emission module 12, a management module 14 and a reception surface S so as to receive the user apparatus 20.

Figure 2:
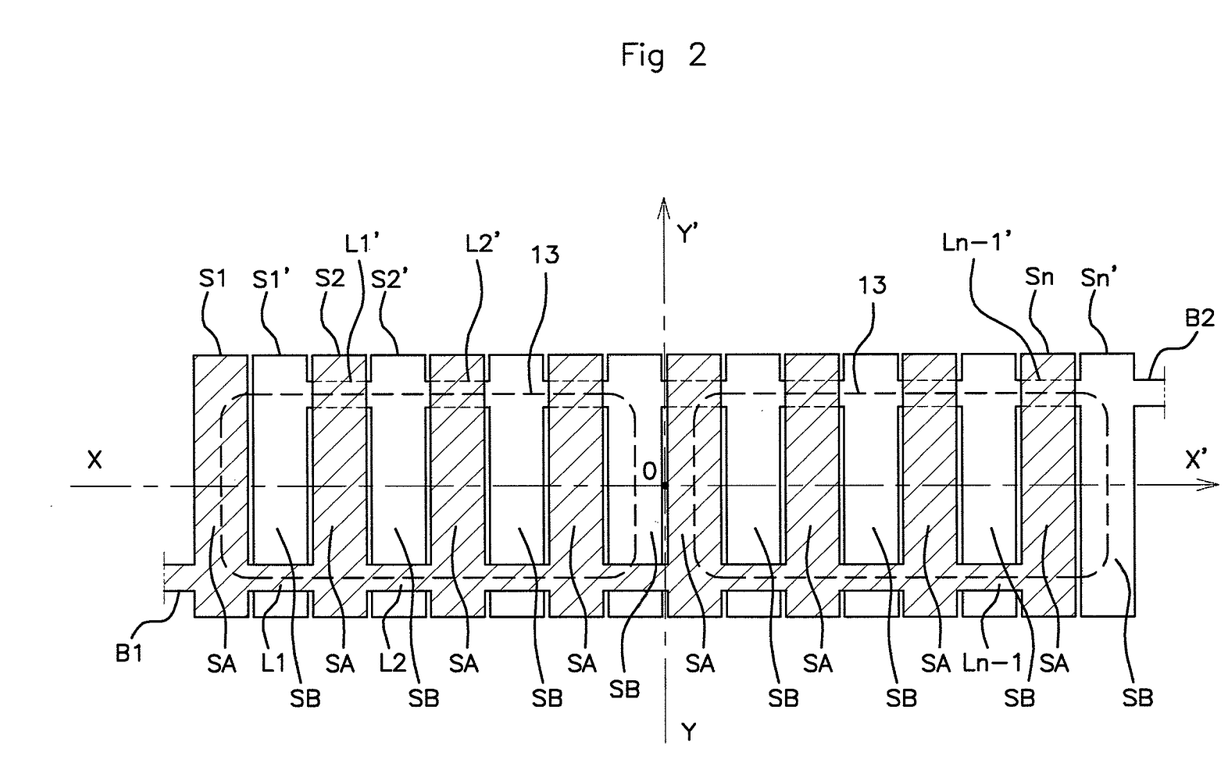

The emission module 12, comprises at least one emitting antenna 13. In FIG. 2 are represented two coplanar and mutually identical emitting antennas 13. By emitting antenna 13 is meant a coil suitable for emitting at a frequency of recharging by magnetic induction.

The two emitting coils 13 are situated below the reception surface S and emit an electromagnetic field around said reception surface S, more precisely in an emission zone 11 (cf. FIG. 2).

The management module 14, generally taking the form of software integrated into a printed circuit (not represented in FIG. 1) is able to detect the presence of the user apparatus 20 on the reception surface S. This is achieved by the emission of a recognition signal, called "ping" in the prior art, and the reception in return by the control module 14 of an identifying message originating from the user apparatus 20.

Once the user apparatus 20 has been identified and is compatible with the frequency of recharging by magnetic induction of the recharging device 10, the management module 14 then commands the recharging of the user apparatus 20 by way of the emission module 12.

In order to be recharged, the user apparatus 20, for its part comprises a battery 21 to be recharged periodically, a reception module 22, comprising at least one reception antenna 23, and a control module 24 (cf. FIG. 1).

The reception antenna 23 receives the electromagnetic waves originating from the emitting coil 13, and exhibits at its terminals a voltage, which recharges, by way of the reception module 22, the battery 21.

The control module 24 is able to communicate, by way of the reception module 22 with the recharging device 10.

In this instance, once the battery 21 has been recharged, the control module 24 commands the emission of charge stoppage directed to the recharging device 10, by way of the reception antenna 23.

This is known from the prior art.

An aspect of the invention proposes a device D for detecting presence of a metallic object 30 on the reception surface S of the recharging device 10, thus avoiding the recharging of the user apparatus as long as the parasitic metallic object 30 is detected on the reception surface S and the user has not removed it from said surface.

With this aim, the detection device D comprises:
at least two mutually identical passive detection coils B1, B2, situated between the reception surface S and the emitting coil 13,
each coil B1, B2 forms a continuous loop, open at its ends and comprises a plurality of identical segments respectively S1, S2 . . . Sn and S1', S2', Sn', mutually spaced by a link respectively L1, L2 . . . Ln−1, and L1', L2' . . . Ln−1',
said two coils B1, B2 are superposed in two parallel planes P1, P2, and are mutually offset by a segment, in such a way that the respective segments S1, S2 . . . Sn and S1', S2' . . . Sn' of each coil B1, B2 cover distinct surface areas SA, SB of the reception surface S,
the segments S1, S2 . . . Sn and S1', S2' . . . Sn' are disposed in a symmetric manner with respect to one of the two perpendicular axes X-X' and Y-Y' crossing at a center 0 of the reception surface S.

The two detection coils B1, B2 being situated between the emitting coil 13 and the reception surface S, they receive a part of the electromagnetic field emitted by the emitting coil 13.

By continuous loop, open at its ends, is meant at least one uninterrupted winding of electrically conducting copper wire, allowing the passage of the current through said wire, from a first end to a second end.

Since the detection coils B1, B2 receive a part of the magnetic field emitted, they exhibit at their terminal a voltage induced by the presence of said electromagnetic field.

The segments S1, S2 . . . Sn and S1, S2 . . . Sn' consist of excursions of the winding of each coil B1, B2 in the direction of the ends of the reception surface S (cf. FIG. 2).

The links of each coil B1, B2, respectively L1, L2 . . . Ln−1, and L1', L2' . . . Ln−1' make it possible to connect the segments of each coil B1, B2 together. Said links L1 . . . Ln−1, L1' . . . Ln−1' are of smaller dimensions than the dimensions of the segments S1 . . . Sn, S1' . . . Sn'.

Preferentially, the links L1 . . . Ln−1, L1' . . . Ln−1' are mutually identical. The reception surface S defines two perpendicular axes X-X' and Y-Y' crossing at a center 0 of said surface S (cf. FIG. 2). The segments S1, S2 . . . Sn' and S1', S2' . . . Sn' are disposed in a symmetric manner with respect to one of the two axes. As illustrated in FIG. 2, the segments S1, S2 . . . Sn, S1', S2' . . . Sn' are symmetric with respect to the longitudinal axis X-X'.

In a first embodiment, the two parallel planes P1, P2 are distinct and mutually spaced apart by a distance. The distance may for example be of the order of a millimeter.

In a second embodiment, the two parallel planes P1, P2 are merged as one.

All the segments S1, S2 . . . Sn, S1', S2' . . . Sn' of the two coils B1, B2 are coplanar. The links L1, L2 . . . Ln−1, L1', L2' . . . Ln−1' of each coil B1, B2 overlap the segments S1, S2 . . . Sn, S1', S2' . . . Sn' of the other coil either from below or from above.

For example, the links L1, L2 . . . Ln of the coil B1 overlap the segments S1', S2' . . . Sn' of the coil B2 from below so as to connect the segments S1, S2 . . . Sn of the coil B1 together.

The segments S1, S2 . . . Sn, S1', S2 . . . Sn' are of smaller dimensions than the dimensions of the emitting coil 13. Preferentially, a number of segments S1, S2 . . . Sn, S1', S2' . . . Sn' is proportional to the number of emitting coils 13. For example, the number of segments S1, S2 . . . Sn, S1', S2' . . . Sn' is equal to k times the number of emitting coils 13, with k≥4.

In a preferential embodiment of an aspect of the invention, the distinct surface areas SA, SB of the segments, respectively S1, S2 . . . Sn, S1', S2' . . . Sn' cover the reception surface S. Let:

$$SA+SB=S.$$

With:

SA: surface area of the segments S1, S2 . . . Sn of the first coil B1.

SB: surface area of the segments S1', S2' . . . Sn' of the second coil B2

S: reception surface area.

Such as disposed, the passive detection coils B1, B2, are electromagnetically "neutral", more precisely, the assembly consisting of the passive detection coils B1, B2 does not generate any induced electromagnetic field, although said coils receive the magnetic field emitted by the emitting coil 13. Indeed, the passive detection coils B1, B2 each emit a field of equal value but of opposite electromagnetic orientation, said fields oppose one another and cancel one another out. The electromagnetic resultant is therefore zero.

Figure 3:
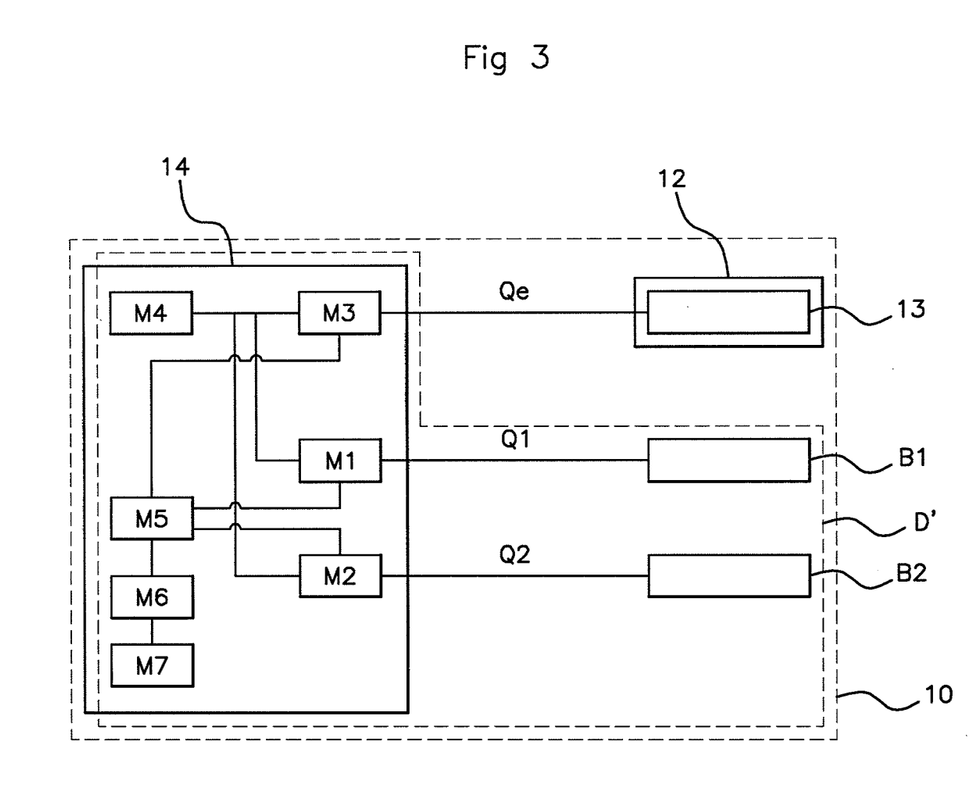

According to an aspect of the invention, the detection device D also comprises:

first means M1 for determining a first quality factor Q1 across the terminals of the first coil B1, second means M2 for determining a second quality factor Q2 across the terminals of the second coil B2, third means M3 for determining a third quality factor Qe across the terminals of the emitting coil 13, means M4 of control of the first, second, third means M1, M2, M3, means M5 of storage of the first, second and third quality factor Q1, Q2, Qe at predetermined instants, means M6 of calculation of ratios R1, R1', R2, R2' between the first, second and third quality factors Q1, Q2, Qe stored, or between values of quality factors stored at different predetermined instants Q1$i$, Q1$f$, Q2$i$, Q2$f$, Qe$i$, Qe$f$, means M7 of comparison between the ratios R1, R2, R1', R2' so as to detect the presence of a parasitic metallic object 30 on the reception surface S.

The first means M1, the second means M2, the third means M3, the control means M4, the storage means M5, the calculation means M6 and the comparison means M7 can take the form of software, for example integrated into the management module 14, itself included in a microcontroller.

The quality factor of a coil is calculated according to the following equation:

$$Qi = \frac{2 \times \pi \times f \times Li}{Ri}$$

With:

π: constant equal to 3.14;

f: frequency of measurement of the quality factor Qi of said coil

Li: inductance of the coil at the measurement frequency f,

Ri: resistance of the coil at the measurement frequency f

Or equally:

$$Qi = \tan \varphi$$

Figure 4:
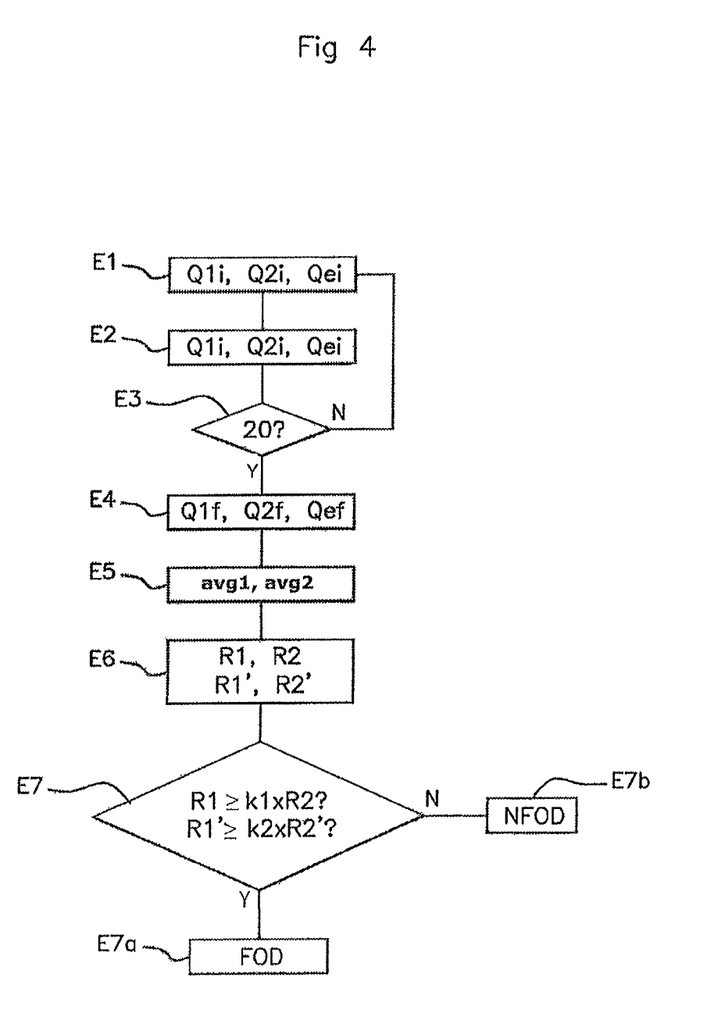

With:

φ: phase shift between the current and the voltage across the terminals of the coil The method of detecting presence of a parasitic metallic object 30 on the reception surface S of a device 10 for recharging by induction of a battery 21 of a user apparatus 20 according to an aspect of the invention, is illustrated in FIG. 4 and is described hereinbelow.

During a first step E1, when the management module 14 detects the absence of user apparatus 20 on the reception surface S, the first means M1, the second means M2, the third means M3 measure or determine respectively the first initial quality factor Q1$i$ across the terminals of the first coil B1, the second initial quality factor Q2$i$ across the terminals of the second coil B2 and the third initial quality factor Qe$i$ across the terminals of the at least one emitting coil 13.

The detection of the absence of user apparatus 20 is validated in the following manner: the management module 14 commands the emission of a "ping", a specific signal, by way of the emitting coil 13. The absence of response by a receiving coil 23 to this specific signal signifies the absence of a user apparatus 20 on the reception surface S.

As explained previously, the estimation of the quality factor is carried out by measuring the inductance Li and the resistance Ri of the coil at a predetermined measurement frequency f or on the basis of the phase shift φ between the current and the voltage across the terminals of the coil.

During a second step, E2 the storage means M5 record in a dedicated memory space the values of the first, second and third initial quality factor Q1$i$, Q2$i$, Qe$i$.

Next when, during a third step E3, the management module 14 detects the presence of the user apparatus 20 on the reception surface S (response of the receiving coil 23 to the "ping" emitted by the emitting coil 13) then there follows the fourth step E4 which consists of the measurement or the determination by the first means M1, the second means M2 and the third means M3 of the first final quality factor Q1$f$ across the terminals of the first coil B1, of the second final quality factor Q2$f$ across the terminals of the second coil B2 and of the third final quality factor Qe$f$ across the terminals of the at least one emitting coil 13.

In a fifth step E5, the calculation means M6 calculate a first average avg1 between the first initial quality factor Q1$i$ and the second initial quality factor Q2$i$.

$$avg1 = \frac{Q1i + Q2i}{2}$$

and a second average avg2 between the first final quality factor Q1$f$ and the second final quality factor Q2$f$.

$$avg2 = \frac{Q1f + Q2f}{2}$$

The sixth step E6, then consists in calculating, by way of the calculation means M6:
- a first ratio R1, R1' between the third initial quality factor Qei and the third final quality factor Qef or respectively between the third initial quality factor Qei and the first average avg2,
- a second ratio R2, R2' between the first average avg1 and the second average or respectively between the third final quality factor Qef and the second average avg2.

During the final step E7, the comparison means M7 compare the value of the first ratio R1, R1' in relation respectively to the value of the second ratio R2, R2'.

If:

$$R1 \geq k1 \times R2$$

Or if:

$$R1' \geq k2 \times R2'$$

With:

$$R1 = \frac{Qei}{Qef}$$

$$R1' = \frac{Qei}{avg1}$$

And $$R2 = \frac{avg1}{avg2}$$

$$R2' = \frac{Qef}{avg2}$$

With k1: predetermined constant, lying between 0.8 and 1.
k2: predetermined constant, lying between 0.8 and 1.
The constants k1 and k2 are determined beforehand as a function of the emitting coil 13 (size, shape, type . . . ) and as a function of the precision of the measurement means.

Then, there is presence of a parasitic metallic object 30 on the reception surface S (E7$a$), else there is no parasitic metallic object 30 on the reception surface S (E7$b$).

An aspect of the invention therefore resides upon the estimation of the impact of the presence of the user apparatus 20 on the averaged quality factor of the passive detection coils B1, B2, this impact, in the absence of metallic parasitic object 30 should be substantially the same (to within a factor k1, k2) as that on the quality factor Qe of the emitting coil 13.

When the user apparatus 20 and a parasitic metallic object 30 are simultaneously present on the reception surface S, then the impact on the quality factor Qe of the emitting coil 13 is more significant than that on the passive detection coils.

Indeed, the presence of the parasitic metallic object 30 creates a further loss of the power emitted across the terminals of the emitting coil 13 (due to the presence of additional resistivity) that the control module 14 compensates by increasing the emission power, the effect of which is to lower the quality factor Qe of the emitting coil 13.

Conversely, the passive detection coils B1, B2 not being connected to any control module 14, they do not adapt, and experience the presence of the parasitic metallic object 30, thereby lowering the value of the averaged quality factor of said coils, however, due to the absence of adaptation, by a lesser amplitude than that of the emitting coil 13.

An aspect of the invention therefore makes it possible to detect reliably and inexpensively (two coils and software means) the presence of a parasitic metallic object on a reception surface of a device for recharging a user apparatus.

The invention claimed is:

1. A device for detecting a presence of a parasitic metallic object on a reception surface of a device for recharging by induction of a battery of a user apparatus for an automotive vehicle, said recharging device comprising:
an emission module,
a management module, and
the reception surface for the user apparatus,
said emission module comprising at least one induction emitting coil type antenna coupled to the reception surface and configured to generate an electromagnetic field around the reception surface in an "emission" zone,
said management module of the device being configured to detect a presence of the user apparatus on the reception surface and to control the emission module
at least two identical passive detection coils, situated between the emitting coil and the reception surface:
each coil, a first coil and a second coil forming a continuous loop, open at its ends and comprising a plurality of identical mutually spaced segments connected together by a link,
said two coils being superposed, in two parallel planes, and mutually offset by a segment, in such a way that the respective segments of each coil cover distinct surface areas of the reception surface,
the segments being disposed in a symmetric manner with respect to one of two perpendicular axes crossing at a center of the reception surface,
first means for determining a first quality factor across terminals of the first coil,
second means for determining a second quality factor across the terminals of the second coil,
third means for determining a third quality factor across terminals of the emitting coil, means of control of the first, second, and third determining means, means of storage of the first, second and third quality factor at predetermined instants, means of calculation of ratios between the first, second and third quality factors stored, or between values of quality factors stored at different predetermined instants, means of comparison between the ratios so as to detect the presence of the parasitic metallic object on the reception surface.

2. The device for detecting a presence of a parasitic metallic object as claimed in claim 1, wherein the calculation means calculates:

a first ratio which is equal to the ratio between a third initial quality factor and a third final quality factor, a second ratio which is equal to the ratio between an average of the first initial quality factor and of the second initial quality factor and an average of the first final quality factor and of the second final quality factor, and the comparison means compares the first ratio with the second ratio.

3. The device (D) for detecting a presence of a parasitic metallic object as claimed in claim 1, wherein a first ratio which is equal to the ratio between a third initial quality factor and an average of the first initial quality factor and of the second initial quality factor, a second ratio which is equal to the ratio between a third final quality factor, and an average of the first final quality factor and of the second final quality factor, and the comparison means compares the first ratio with the second ratio.

4. The device for detecting a presence of a parasitic metallic object as claimed in claim 1, wherein the parallel planes are merged.

5. The device for detecting a presence of a parasitic metallic object, as claimed in claim 1, wherein the segments are of smaller dimensions than the dimensions of the emitting coil.

6. The device for detecting a presence of a parasitic metallic object, as claimed in claim 1, wherein a number of segments is k times proportional to a number of emitting coils, with k>4.

7. The device for detecting a presence of a parasitic metallic object, as claimed in claim 1, wherein a sum of the distinct surface areas covered by the segments of said two coils is substantially equal to the reception surface area.

8. The device for detecting a presence of a parasitic metallic object, as claimed in claim 1, wherein the passive detection coils consist of a single winding of copper wire.

9. The device for detecting a presence of a parasitic metallic object, as claimed in claim 1, wherein the first determining means, the second determining means, the third determining means, the storage means, the control means, the calculation means and the comparison means take the form of non-transitory software, integrated into the management module.

10. A method of detecting a presence of a parasitic metallic object, using the detection device as claimed in claim 1, comprising:

Step E1: Prior determination of the first initial quality factor, of the second initial quality factor, and of the third initial quality factor in the absence of the user apparatus on the reception surface, Step E2: storing the values of the first initial quality factor, the second initial quality factor, and the third initial quality factor, Step E3: detecting the presence of the user apparatus on the reception surface, Step E4: determining the first final quality factor, the second final quality factor, and the third final quality factor, Step E5: calculating a first average between the first initial quality factor and the second initial quality factor, and a second average between the first final quality factor and the second final quality factor, Step E6: calculating a first ratio between the third initial quality factor and the third final quality factor, or between the third initial quality factor and the first average, and calculating a second ratio between the first average and the second average, or between the third final quality factor and the second average, Step E7: If the first ratio is greater, to within a predetermined factor, than the second ratio, then:

presence of a parasitic metallic object on the reception surface,

Else absence of said parasitic metallic object.

11. An automotive vehicle, comprising a detection device as claimed in claim 1.

* * * * *